July 27, 1965  R. A. TAUBENHEIM  3,197,173
PINCH VALVE
Filed July 12, 1960

INVENTOR.
ROY A. TAUBENHEIM
BY John W. Michael
ATTORNEY

United States Patent Office 3,197,173
Patented July 27, 1965

3,197,173
PINCH VALVE
Roy A. Taubenheim, Milwaukee, Wis., assignor, by mesne assignments, to John H. Van Dyke, Milwaukee, Wis.
Filed July 12, 1960, Ser. No. 42,399
7 Claims. (Cl. 251—6)

This invention relates to valve controls for liquid dispensing devices and particularly to an improved pinch-type valve in which a pair of opposed closure members or jaws are moved towards and away from each other to effect a valve action in a flexible tube.

In the brewing industry, as in any industry where liquids are to be dispensed for human consumption, cleaning of the dispensing apparatus is of primary importance because of the rigid sanitation requirements.

The primary object of this invention is to provide an improved pinch-type valve which is particularly suited for use in the brewing industry.

Another object of the present invention is to provide a valve which has the actuating mechanism isolated from the liquid flow path and which can be cleaned by ball type brushes in order to meet sanitation requirements.

A further object is to provide an improved pinch-type valve having a long operating life and requiring little maintenance.

Other objects and advantages will be pointed out in, or be apparent from, the specification and claims, as will obvious modifications of the single embodiment shown in the drawings, in which:

Figures 1, 2:
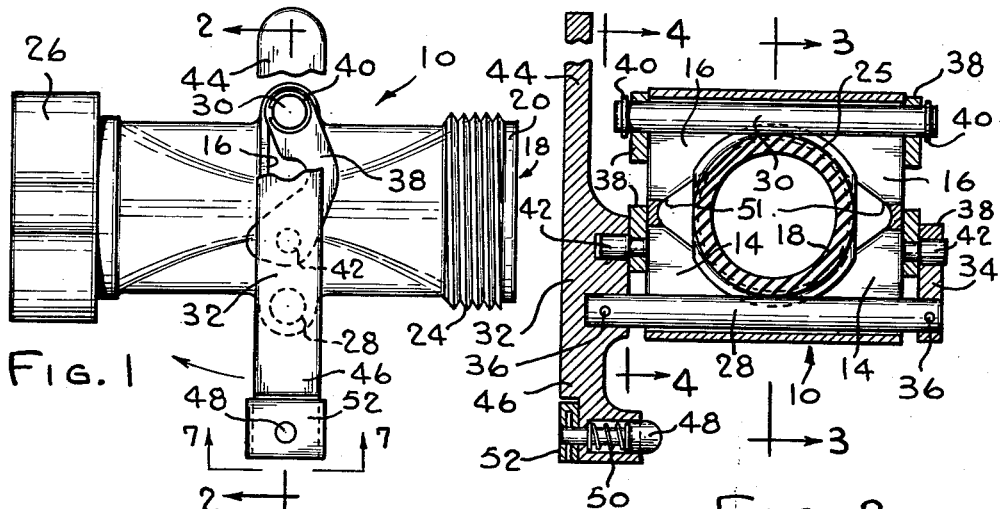
FIG. 1 is a top elevation of the valve with the handle in the open position.
FIG. 2 is taken on line 2—2 of FIG. 1 showing the tube in the open position.

Referring to the drawings, it will be seen that the valve housing 10 has a cylindrical bore 12 and a pair of slots 14, 16 located in a plane transverse to the axis of the bore. A flexible or elastic liner 18 having end flanges 20 is inserted within bore 12 with the end flanges extending beyond the ends of the housing to hold the liner in position and provide a seal when connected to a dispensing line. Any conventional connecting means such as the threads 24 or the coupling or union 26 held on by snap ring 27 may be provided at either end of the housing for ready attachment to the dispensing line.

Figures 3, 4:
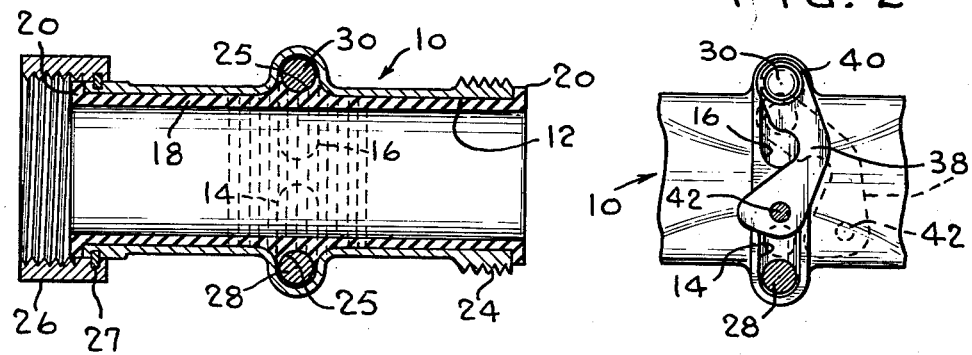
FIG. 3 is taken on line 3—3 of FIG. 2 showing the position of the closure member in the open position.
FIG. 4 is taken on line 4—4 of FIG. 2 showing the relation of the closure members and the link.

The outside diameter of the liner is approximately equal to the inside diameter of the cylindrical bore so that the housing provides a rigid backing for the liner to prevent any distortion of the tube due to line pressure. A cord of rayon or like material may be imbedded within the liner (approximately twelve turns per inch as shown in FIG. 3) to strengthen the liner against high line pressures adjacent the areas of the bore of the housing which are cut away to allow for pinching of the valve as described hereinafter. Reinforced grooves 25 are provided on the outer wall intermediate the ends of the liner adjacent slots 14, 16 to strengthen the liner in the area where maximum flexure occurs. Valve action is accomplished by moving parallel rollers 28, 30 aligned with grooves 25 toward and away from each other in slots 14, 16. Since the slots lie in a plane transverse to the axis of the tube, a pinching action is effected on the liner which will stop the flow of liquid in either direction through the valve. The rollers are closed by a simple lever mechanism which includes a novel floating pivot arrangement to control the motion of the rollers in response to the resistance of the tube to closing motion. The lever mechanism includes (1) a pair of parallel crank arms 32, 34 rigidly secured to roller 28 by pins 36 and (2) a pair of parallel links 38 connected to roller 30 by clips 40 and pivoted on pins 42 on the crank arms. The crank arm 32 has an extended portion forming a handle 44 and another extending portion for mounting a locking mechanism 46.

Figure 6:
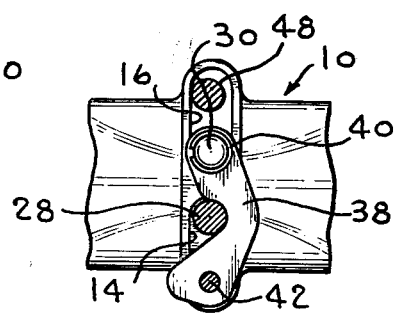
FIG. 6 is similar to FIG. 4 showing the relation of the closure members and link when in the closed position.
Figure 7:
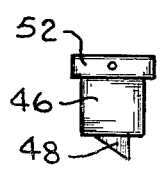
FIG. 7 is taken on line 7—7 of FIG. 1 showing the latch.

The valve is closed by rotating the crank arms 32 and 34 clockwise (FIG. 4) about roller 28 until a pin 48 of the locking mechanism snaps into slot 16. It can be seen that as the crank arms are rotated, links 38 will slide roller 30 in slot 16 toward roller 28. When the resistance to compression of the liner adjacent roller 30 becomes greater than the resistance to compression of the liner adjacent roller 28, roller 30 will stop and the crank arms will pivot on pins 42 sliding roller 28 in slot 14 toward roller 30. When the force on roller 28 becomes greater than the force on roller 30, then the crank arm will again pivot on roller 28 pulling roller 30 toward roller 28. The movement of the rollers will continue until the crank arms have been rotated through 180° (FIG. 6). In actual operation, the rollers will generally move simultaneously towards each other because the resistance to compression on either side of the liner is approximately equal, independent movement occurring only when the resistance to motion of the liner is substantially greater on one side or the other.

Figure 5:
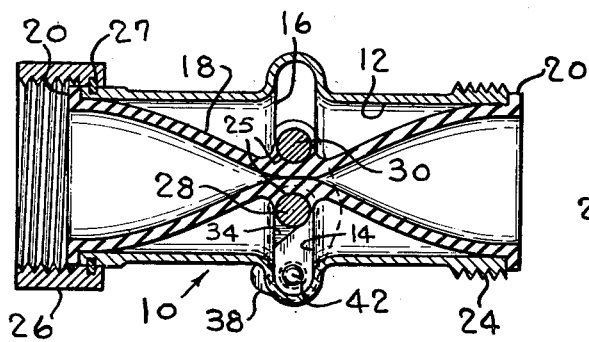
FIG. 5 shows the valve in the closed position.

When the handle has been rotated through 180°, and pin 48 is locked in slot 16 due to the bias of a spring 50, the rollers will be locked in the closed position. The liner will be squeezed (FIG. 5) between the rollers preventing flow in either direction through the liner. It has been found that at high line pressure it is preferable to have the liner side of the roller 28 rotate against the direction of flow. That is, as seen in FIG. 3, flow should be from right to left because the roller 28 rotates clockwise in closing. Diametrically opposed grooves 51 are provided in the housing transverse to the plane of the rollers to allow for the distortion of the liner when it is compressed between the rollers. The valve is opened by pulling up on head 52 of pin 48, releasing the handle from the slot. The pressure of the liquid in the line and the inherent resiliency of the liner will force the rollers outward, causing the handle to rotate counterclockwise through 180°. The valve can be opened slowly by merely holding the handle and allowing it to rotate slowly to the fully open position.

It can be seen that the liner presents an unobstructed flow path which can be easily cleaned by ball brush cleaners commonly used in the brewing industry. The cylindrical bore of the housing will prevent any distortion from occurring in the shape of the liner at normal pressures, and the cord strengthens the liner adjacent grooves 51, thereby assuring that the ball brush cleaner contacts the entire inside surface of the liner. The control mechanism requires very little maintenance because of its separation from the liquid flow path and its few moving parts.

Although but a single embodiment of the present invention has been illustrated and described, it will be apparent to those skilled in the art that various changes and modifications may be made therein without departing from the spirit of the invention or from the scope of the appended claims.

I claim:

1. A valve to regulate the flow of fluid through a tube comprising, a cylindrical housing including a pair of slots lying in a plane transverse to the axis of the housing, a flexible liner positioned within the housing, a pair of rollers positioned in the slots on opposite sides of the liner, said rollers being movable in the slots from an outer to an inner position, a handle rigidly secured to one of the rollers, and a link secured to the other roller and pivoted on the handle, the pivot on the handle lying between the rollers on a line connecting the axes of the rollers when the rollers are in the outer position, and said pivot lying on an extension of the line connecting the axes of the rollers when the rollers are moved to the inner position compressing the lining therebetween.

2. A valve according to claim 1, wherein said flexible liner includes a cord imbedded within the liner to strengthen the liner against distortion at high line pressure.

3. A valve to regulate the flow of fluid through a pipe comprising, a cylindrical housing, a flexible liner positioned on the axis of the housing, a pair of rollers movable in the housing in a plane transverse to the axis of the liner from an outer to an inner position, a handle pivoted on one of the rollers, a link pivoted on the handle and connected to the other roller, said one roller acting as the fulcrum for pulling said other roller to the inner position, and said pivot for the link acting as the fulcrum for moving the said one roller to the inner position, said rollers moving individually or simultaneously to the inner position depending on the resistance of the liner to compression.

4. A valve according to claim 3 including means for locking the rollers in the inner position with the valve closed, said rollers moving to the outer position on releasing the locking means due to the pressure of the liquid in the liner and said housing including means for retaining the contour of the tubing when the rollers are in the outer position.

5. A valve to regulate the flow of fluid through a pipe comprising, a housing installed between spaced portions of the pipe, a flexible liner positioned within and supported by the housing and connecting the portions of the pipe, a first and second roller movable within the housing and positioned on either side of the liner, said rollers having their axes perpendicular to the axis of the liner, and means for moving said rollers toward each other comprising a pair of crank arms rotatably secured to said first roller and a link secured to said second roller and pivoted on said crank arms, said means being responsive to rotation of the crank arms about said first roller and about said pivot to close the rollers on said liner either independently or simultaneously according to the resistance of the liner adjacent each roller to compression.

6. A valve according to claim 5 wherein the inside diameter of the housing is substantially equal to the outside diameter of the liner so that the housing supports the liner when the valve is fully open.

7. A valve according to claim 5 including latch means on one of the crank arms to lock the rollers in the closed position.

References Cited by the Examiner

UNITED STATES PATENTS

| 1,024,876 | 4/12 | Barbour | 251—8 |
| 2,641,087 | 6/53 | Greiser | 251—9 XR |
| 2,716,575 | 8/55 | Vickers | 251—5 XR |

FOREIGN PATENTS

| 1,017,265 | 1952 | France. |
| 1,200,185 | 1959 | France. |
| 325,585 | 1957 | Switzerland. |

ISADOR WEIL, *Primary Examiner.*

M. CARY NELSON, *Examiner.*